(12) United States Patent
De Malsche et al.

(10) Patent No.: US 11,933,710 B2
(45) Date of Patent: Mar. 19, 2024

(54) 3D PARTICLE IMAGING

(71) Applicant: VRIJE UNIVERSITEIT BRUSSEL, Brussels (BE)

(72) Inventors: Wim De Malsche, Berchem (BE); Ozlem Sardan Sukas, Eindhoven (NL); Manly Callewaert, Ledeberg (BE); Pierre Gelin, Wemmel (BE)

(73) Assignee: VRIJE UNIVERSITEIT BRUSSEL, Brussels (BE)

( * ) Notice: Subject to any disclaimer, the term of this patent is extended or adjusted under 35 U.S.C. 154(b) by 752 days.

(21) Appl. No.: 17/047,998

(22) PCT Filed: Apr. 17, 2019

(86) PCT No.: PCT/EP2019/059953
§ 371 (c)(1),
(2) Date: Oct. 15, 2020

(87) PCT Pub. No.: WO2019/202007
PCT Pub. Date: Oct. 24, 2019

(65) Prior Publication Data
US 2021/0140869 A1    May 13, 2021

(30) Foreign Application Priority Data

Apr. 17, 2018  (EP) .................................. 18167868

(51) Int. Cl.
*G02B 21/16* (2006.01)
*G01N 15/14* (2006.01)
(Continued)

(52) U.S. Cl.
CPC ....... *G01N 15/147* (2013.01); *G01N 15/1434* (2013.01); *G01P 5/001* (2013.01);
(Continued)

(58) Field of Classification Search
CPC ............ G01N 15/147; G01N 15/1434; G01N 2015/0053; G01N 2015/1075;
(Continued)

(56) References Cited

U.S. PATENT DOCUMENTS 3,013,467 A * 12/1961 Minsky .............. G02B 21/0024
250/215
11,041,797 B2 * 6/2021 Hart ................... G01N 15/1484

OTHER PUBLICATIONS

Lima et al., "Confocal Micro-PIV Measurements of Three-Dimensional Profiles of Cell Suspension Flow in a Square Microchannel," Measurement Science and Technology, vol. 17, No. 4, Mar. 2, 2006, pp. 797-808.

(Continued)

*Primary Examiner* — David P Porta
*Assistant Examiner* — Fani Polyzos Boosalis
(74) *Attorney, Agent, or Firm* — Workman Nydegger

(57) ABSTRACT

A system for imaging particles in a fluid includes a substrate holder for holding a substrate comprising a channel or reservoir for containing the fluid in the substrate, a radiation source for providing irradiation in the substrate and a radiation detection unit for detecting particles in the fluid in the substrate. At least one of the radiation source and the radiation detection unit) are configured to obtain detection in one or more distinct detection sheets in the substrate. The system further comprises an actuator configured for imparting an oscillating mechanical movement of the substrate holder regarding the radiation detection unit and the radiation source, the oscillating mechanical movement being a movement comprising a movement component in a direction perpendicular to the plane wherein the one or more detection sheets are extending.

15 Claims, 6 Drawing Sheets

(51) Int. Cl.
| | |
|---|---|
| *G01P 5/00* | (2006.01) |
| *G02B 21/26* | (2006.01) |
| *G02B 21/36* | (2006.01) |
| *G01N 15/00* | (2006.01) |
| *G01N 15/10* | (2006.01) |

(52) U.S. Cl.
CPC ............ *G02B 21/16* (2013.01); *G02B 21/26* (2013.01); *G02B 21/365* (2013.01); *G01N 2015/0053* (2013.01); *G01N 2015/1075* (2013.01); *G01N 2015/1445* (2013.01)

(58) Field of Classification Search
CPC . G01N 2015/1445; G01P 5/001; G02B 21/16; G02B 21/26; G02B 21/365
See application file for complete search history.

(56) References Cited

OTHER PUBLICATIONS

Duocastella et al., "Simultaneous Multiplane Confocal Microscopy Using Acoustic Tunable Lenses," Optics Express, Optical Society of America, vol. 22, No. 16, Aug. 11, 2014, 9 Pages.

"InvenSense and GLOBALFOUNDRIES Collaborate on Industry-Leading Ultrasonic Fingerprint Imaging Technology," InvenSense, Mar. 9, 2017, 6 Pages.

Horsley, "Piezoelectric Micromachined Ultrasonic Transducers in Consumer Electronics the Next Little Thing?", UC Davis, University of California, Apr. 28, 2017, 59 Pages.

Gerardo et al., "Fabrication and Testing of Polymer-Based Capacitive Micromachined Ultrasound Transducers for Medical Imaging," Microsystems & Nanoengineering, vol. 4, No. 19, Aug. 27, 2018, pp. 1-12.

Fitzpatrick, "Sensors Expo: CMUTs Enable Next-Gen Ultrasound Systems," Fierce Electronics, Jun. 19, 2018, 9 Pages.

"CMUT Transducers for Research Ultrasound," Verasonics, retrieved from http://verasonics.com/cmut-hf-transducers/ on Oct. 15, 2020, 3 pages.

International Search Report and Written Opinion from corresponding PCT Application No. PCT/EP2019/059953, dated May 15, 2019.

Extended European Search Report from corresponding EP Application No. 18167868.1, dated Oct. 19, 2018.

"Micromachined Ultrasonic Transducers", Fraunhofer IPMS, retrieved from the Internet from https://www.ipms.fraunhofer.de/en/research-development/cmut.html on Oct. 15, 2020, 5 pages.

Brucker, "Digital-Particle-Image-Velocimetry (DPIV) In A scanning light-sheet: 3D starting flow around A short cylinder", Experiments In Fluids, Aug. 1, 1995, pp. 255-263, vol. 19, No. 4.

Fahringer, Timothy et al., "Volumetric particle image velocimetry with a single plenoptic camera", Measurement Science And Technology, IOP Publishing, Sep. 29, 2015, pp. 1-25, vol. 26, No. 11.

Communication Pursuant to Article 94(3) EPC from Corresponding European Patent Application EP19717496.4, dated Oct. 2, 2023.

* cited by examiner

3D PARTICLE IMAGING

FIELD OF THE INVENTION

The invention relates to the field of particle detection and analysis in a flow. More specifically it relates to systems for performing particle image velocimetry (PIV) and optical slicing, and methods thereof.

BACKGROUND OF THE INVENTION

After a very long incubation period of about 3 decades, it is only since the last decade that microfluidic devices have achieved the stage of being reliable, reproducible and economic and that the first commercial products are emerging. Many applications exist in science and engineering where it is important to measure the micro-scale flow field. Characterization of microfluidic devices is also of critical importance in a wide range of industrial applications including aerospace, computer, automotive, and biomedical industries. Some examples from the aerospace industry are micron-scale supersonic nozzles to be used as microthrusters on micro-satellites and as flow control devices for a palm-size micro-aircraft. Inkjet printers is an important application area of microfluidics in computer industry, occupying 65% of the printer market. These devices consist of an array of nozzles with orifices smaller than 100 µm, where characterization of the flow is critical. Investigation of boundary layers in internal combustion engines is an interesting application of micro-scale particle imaging velocimetry (PIV) in automotive.

In addition to the above industries, microfluidic devices have many applications in the biomedical industry, targeting patient diagnosis, patient monitoring, and drug delivery. Microscale flow cytometers for cancer cell detection, micro-machined electrophoretic channels for DNA fractionation, and polymerase chain reaction (PCR) chambers for DNA amplification are some examples of microfluidic applications in the field. Details of the fluid motion through micron-sized channels/inlets/outlets, coupled with nonlinear interactions between macromolecules, cells, and the surface-dominated physics of the channels create very complicated phenomena, which can be difficult to simulate numerically. Indeed, with flow propulsion approaches based on acoustics, electro-osmotic effects, pressure on the one hand and features as miniaturized mixers, (phase) separators, crystallizers, droplet generators, etc. on the other hand, the number of new and unique phenomena inherent to miniaturization of flow is immense. However, key in successfully generating the intended effects is a proper understanding of the flow, for which a 3D visualization of the flow is needed. There are consequently new unmet needs and opportunities emerge in research and industry to be able to measure and monitor flow lines in 3D mode with high spatial and temporal resolution.

Particle image velocimetry is a technique that allows to experimentally determine flow lines in a liquid or gas stream. By tracking small particles (for example fluorescent particles) on consecutive images, the lines between them represent the flow lines in the studied time slot.

There are techniques available with thin light sheets that can be placed at different positions or with multiple cameras that give depth information, but these operations take too long in order to be of relevance at a wide range of conditions (especially under transient conditions). Holographic PIV (HPIV) is in theory capable of providing 3D information, but it is too complicated and error-prone to be used for flow measurements. There is no commercially viable solution based on holographic PIV yet.

Up to date, the technologies developed are limited to 2D imaging and those attempting to realize 3D lack seriously in spatial and/or temporal resolution, consequently, there is room for improvement.

SUMMARY OF THE INVENTION

It is an object of embodiments of the present invention to provide a system and method of particle analysis by particle image velocimetry (PIV), easy to use, compact and with capabilities of providing 3D information in real time.

It is an advantage of embodiments of the present invention that 3D imaging of flows through particle image velocimetry principles can be established with high spatial and temporal resolution.

It is an advantage of embodiments of the present invention that the system is user friendly and can be easily handled.

It is an advantage of embodiments of the present invention that fast 3D non-invasive imaging of objects also can be obtained. A fast in-line imaging in 3D detail is advantageous.

It is an advantage of embodiments of the present invention that for obtaining tracking information, information regarding the direction of the motion of a particle in a previous image plane can be used, when scanning subsequent image planes.

The present invention relates to a system for performing for example particle imaging or particle image velocimetry for particles in a fluid. The system may for example be suitable for optical imaging (making slices at different vertical positions) of an object (e.g. a cell or particle) in a fluidic channel, especially challenging in flow or where fast scanning is required. The imaging may be for reconstructing a 3D image of the object. The system may for example also be suitable for tracking, e.g. following migration paths within networks (not necessarily with flow), e.g. between cell organels, in and out cells, exchange between cells (or other objects), through interfaces (non-biological membranes), ... The system may for example be suitable for imaging objects based on fluorescence, although embodiments are not limited thereto and also non fluorescence imaging may be performed using the system.

It is an advantage of embodiments of the present invention that the oscillating mechanical movement is imparted on the substrate holder and not on the radiation detection unit and/or the radiation source. The latter allows for having a fast movement. The imparted movement on the substrate holder therefore may be considered as an absolute imparted movement of the substrate holder.

The system comprises a substrate holder for holding a substrate comprising a channel or reservoir for containing the fluid in the substrate, a radiation source for providing irradiation in the substrate and a radiation detection unit for detecting particles in the fluid in the substrate. At least one of the radiation source and the radiation detection unit is configured so as to obtain detection in one or more distinct detection sheets in the substrate. The system further comprises an actuator configured for imparting an oscillating mechanical movement of the substrate holder with respect to the radiation detection unit and the radiation source, the oscillating mechanical movement being a movement comprising a movement component in a direction perpendicular to the plane wherein the one or more detection sheets are extending.

It is an advantage of embodiments of the present invention that particle image velocimetry can be performed whereby three-dimensional information can be obtained in an efficient manner. It is an advantage of embodiments of the present invention that three-dimensional information can be obtained in an easy manner. It is an advantage of embodiments of the present invention that three-dimensional information can be obtained for flow measurements in a manner that is little or not error-prone. It is an advantage of embodiments of the present invention that a compact scanning system is provided, which allows detection of particles in the cavity volume (e.g. in a fluidic channel) in real time. It is a further advantage that only one radiation source and one detector are needed.

The irradiation and the detection may be fixed with respect to each other, i.e. the irradiation region may be fixed with respect to the detection region throughout the measurement.

The radiation detection unit may have a depth of focus smaller than 100 μm, e.g. smaller than 50 μm, e.g. smaller than 25 μm, e.g. smaller than 5 μm, such as for example between 2 μm and 0.5 μm. It is an advantage of embodiments of the present invention that radiation can be collected by the detector with a focal system centered in a fixed thin stimulation region (e.g. a lens with small focus distance), rather than with a focal system with a large depth of focus. This improves signal-to-noise ratio. Such embodiments may be used in combination with flood irradiation or alternatively with irradiation in an irradiation sheet. In the latter case, the optical source and optical detection unit are configured so that the irradiation sheet is positioned where the optical detection unit has its focus (i.e. corresponding with the depth of focus of the optical detection unit).

The actuator also may be referred to as a vibrator. The actuator typically induces an oscillating mechanical movement or vibration of the substrate holder and thus, when the substrate is positioned in or on the substrate holder.

The actuator may be configured for imparting an oscillation of the substrate holder at a frequency in a range of tens of Hz to 100 kHz. In some examples, the range may be from tens of Hz to 25 kHz.

It is an advantage of embodiments of the present invention that vertical resolution can be high. It is an advantage of embodiments of the present invention that a high oscillating speed can be attained.

These advantages are applicable both for making more accurate velocity profiles as for object imaging.

In some embodiments, the radiation source may be adapted for providing an irradiation sheet, e.g. a planar irradiation sheet, having a thickness smaller than 100 μm, e.g. smaller than 50 μm, e.g. smaller than 25 μm, such as for example between 5 μm and 0.5 μm. The optical power of the optics system may be a laser higher than 5 mW, advantageously at least 10 mW. The optics system may comprise a fiber-pigtail attachment for obtaining a high quality low-noise laser beam output with little or no loss.

It is an advantage of embodiments of the present invention that a thin light sheet along the two dimensions of the cavity (e.g. width and length) can be used, with a very small depth of focus comparable to the typical sizes of particles of interest (e.g. of the order of microns), thus reducing positional indetermination and allowing obtaining three dimensional position information.

The substrate holder may comprise a substrate having a channel for defining a directional flow of fluid in a direction perpendicular to the oscillating mechanical movement provided by the actuator. It is an advantage of embodiments of the present invention that velocimetry of flowing particles in a fluidic channel can be obtained.

The system further may include a position sensor for measuring the relative position of the substrate holder with respect to the one or more detection sheets allowing obtaining three-dimensional positional information of the detected particles. It is an advantage of the embodiments of the present invention that the system can accurately detect position and timing of the stimulating region in the cavity, thus improving the accuracy of the scan.

The actuator may be configured for imparting a movement in a direction perpendicular to the one or more detection sheets over a distance in this direction being at least 1 mm, e.g. at least 2 mm, e.g. at least 5 mm, e.g. at least 20 mm. Advantageously this corresponds with the full channel height of the microfluidic channel. It may be selected to cover only part of the channel, to inspect for example a certain region of the channel. The height over which the substrate may be displaced thus may be from a few micrometer to several centimeter, as long as it can be handled by the actuator. For object imaging, the height of scanning may for example also be in the range from 1 μm to 100 μm. Advantageously, the radiation detection unit should have an exposure time, focusing time and image capturing rate that is adapted to the speed of movement of the substrate and to the characteristics of the irradiation sheet.

The present invention also relates to a method of analyzing particles in a fluid, the method comprising providing a fluid inside a substrate comprising a channel or reservoir, the fluid comprising particles, providing irradiation to the substrate and detecting radiation from particles in the fluid, at least one of said providing irradiation and detecting radiation being adapted so as to detect radiation in one or more detection sheets in the substrate.

The method further comprises providing an oscillating mechanical movement of the substrate with respect to the one or more detection sheets, the oscillating mechanical movement being a movement comprises a movement component in a direction perpendicular to the plane wherein the one or more detection sheets extend.

It is an advantage of embodiments of the present invention that continuous scanning of the cavity volume is provided, thus allowing detection of particles in a volume in real time. It is an advantage of embodiments of the present invention that the oscillating movement can be provided at higher frequency than if the optical system was oscillating. It is a further advantage that detecting radiation can be made with less noise.

Providing an oscillating mechanical movement may comprise providing an oscillating mechanical movement at a frequency in the range of tens of Hertz to 100 kHz. It is an advantage of embodiments of the present invention that high oscillating speeds can be attained, and that temporal resolution is improved. It is a further advantage that the vertical resolution is higher.

Detecting radiation may comprise in some embodiments detecting with a depth of focus smaller than 100 μm, e.g. smaller than 50 μm, e.g. smaller than 25 μm, e.g. smaller than 5 μm, such as for example between 2 μm and 0.5 μm.

Providing a stimulating radiation may comprise providing an irradiation sheet having a thickness smaller than 100 μm, e.g. smaller than 50 μm, e.g. smaller than 25 μm, such as for example between 5 μm and 0.5 μm. It is and advantage of embodiments of the present invention that a small depth of focus can be obtained, thus reducing positional indetermination.

Providing a fluid inside a substrate may comprise providing a directional flow of fluid inside the substrate in a direction perpendicular to the oscillating mechanical movement. It is an advantage of embodiments of the present invention that velocimetry of flowing particles in a fluidic channel can be obtained.

The method may further comprise obtaining three-dimensional positional information of the detected particles by detecting the relative position of the substrate with respect to the one or more detection sheets. It is an advantage of embodiments of the present invention that radiation stemming from particles traversing the stimulation region can be accurately localized as a function of time within the volume of the cavity, thus improving accuracy of the scan.

Providing a relative oscillating movement with a movement component in a direction perpendicular to the plane wherein the one or more detection sheets extend may comprise providing an oscillating movement over a distance in this direction being at least a few micrometer, e.g. at least 1 mm, e.g. at least 2 mm, e.g. at least 5 mm, e.g. at least 20 mm. The movement may be fully in the direction perpendicular to the plane wherein the one or more detection sheets extend.

It is an advantage of embodiments of the present invention that particles in a channel or reservoir of at least 2 mm depth can be analyzed.

The method may further comprise identifying a same particle at different moments and positions during the oscillating movement, and reconstructing the track or velocity field of that particle. It is an advantage of embodiments of the present invention that 3D particle velocimetry can be provided.

The method may further comprise optically slicing a particle during the oscillating movement, projecting the slices on top of another, and reconstructing the particle. It is an advantage of embodiments of the present invention that analysis of the geometry of a particle or cell and optical slicing thereof can be provided. It is a further advantage that reconstruction can be made with a good resolution (for example a resolution of the depth of focus of the radiation in the irradiation region, which may be as low as 1 μm).

The present invention also may relate to the use of a system as described above for detecting the three-dimensional components of the velocity of particles in a fluid.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1, including

FIGS. 2(a) and 2(b), illustrates FIG. 2(a) Top view that is seen in a classical 2D PIV system (and in the 2D projection of our setup) and FIG. 2(b) 3D trajectory of an individual particle.

FIG. 4, including

Figure 1A:
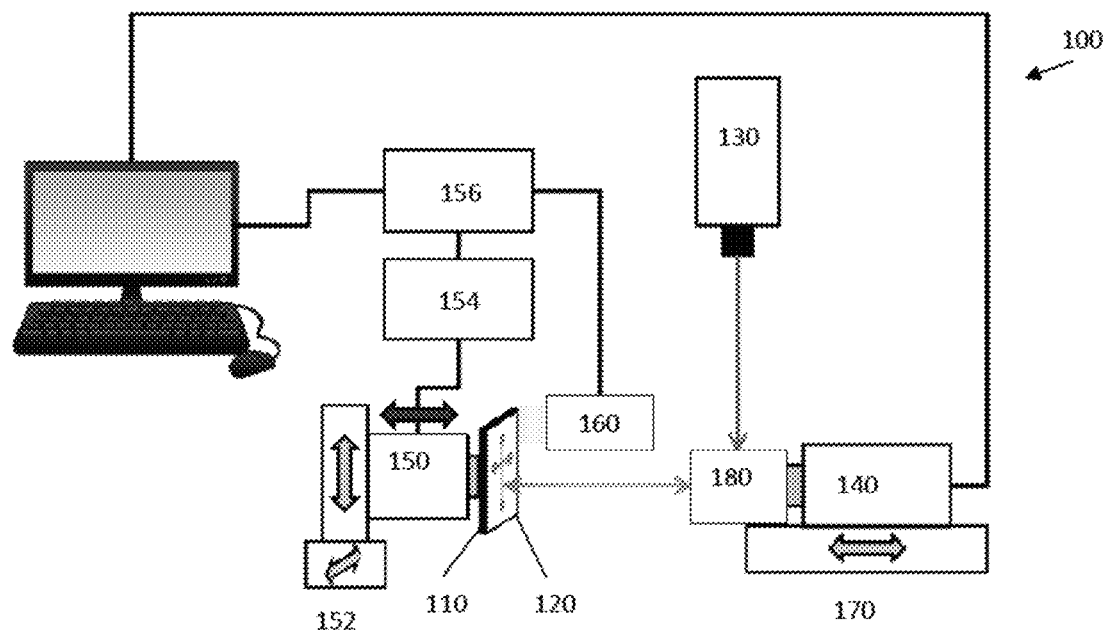
FIGS. 1(a) and 1(b), illustrates two schematic representations of a setup according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "fluid", reference is made to liquids, but also to gases or vapor, which may flow.

In a first aspect, the present invention provides a system for imaging particles. The target particles may include biological particles such as antibodies, virus, bacteria, cells, etc. However, the present invention is not limited to biological or organic samples, and it may be used for inorganic particles. Embodiments of the present invention typically may be suitable for providing particle image velocity (NV), such as 3D-PIV, or for example for optical imaging (making slices at different vertical positions) of an object (e.g. a cell or particle) in a fluidic channel, especially challenging in flow or where fast scanning is required. The imaging may be for reconstructing a 3D image of the object. The system may for example also be suitable for tracking, e.g. following migration paths within networks (not necessarily with flow), e.g. between cell organels, in and out cells, exchange between cells (or other objects), through interfaces (non-biological membranes), . . . The system may for example be suitable for imaging objects based on fluorescence, although embodiments are not limited thereto, and also non-fluorescence imaging may be performed using the system. For example, a system according to the present invention suitable for providing 3D Particle Image Velocimetry (3D PIV) may be identified as a velocimetry system providing 3 component (3 component–XYZ) velocity information in 2D (a plane), 2 component (XY) velocity information in 3D (a volume) and 3C velocity information in 3D.

In the present invention, the particles in a fluid are irradiated (irradiated for imaging or irradiated for stimulating fluorescence from the particles or fluorescent labels thereon) by exposing the fluid (and particles therein) to radiation, e.g. from a radiation source. The resulting radiation is detected by a detection unit. The resulting radiation from particles may be radiation reflected, scattered, transmitted or diffused by the particles, fluorescence emitted by the irradiated particles, for example by target particles comprising fluorescent markers, etc.

In the present invention, the system also comprises a radiation detection unit for detecting particles in the fluid in the substrate.

At least one of the radiation source and the radiation detection unit is configured so as to obtain detection in one or more distinct detection sheets in the substrate. This can be obtained in a plurality of ways. In some embodiments, irradiation in one or more distinct irradiation sheets may be performed and the radiation, after interaction with the particles (or the fluorescence stemming therefrom) is detected. This can be done in some embodiments with an optical radiation detection unit having a large depth of focus. In some other embodiments, the optical radiation detection unit may have one or more regions with a small depth of focus, corresponding with the positions of the irradiation sheets.

In other embodiments, the one or more detection sheets are obtained by irradiating the fluid using flood irradiation and by detecting radiation using a system with one or more distinct regions with a small depth of focus.

According to the present invention, the irradiation region and detection region are fixed with respect to each other, and displacement of the substrate containing the fluid with an oscillating movement with respect to the detection region is performed. By doing so, although the one or more detection sheets are in a fixed position, it is still possible to scan the volume of the fluid in the substrate, ideally the whole volume, in an oscillating, e.g. vibrating, way. The system therefore also comprises an actuator configured for imparting an oscillating mechanical movement of the substrate holder with respect to the radiation detection unit and the radiation source. The oscillating mechanical movement comprises at least a movement component in a direction perpendicular to the plane wherein the one or more detection sheets are extending. The oscillating mechanical movement advantageously may be in a direction perpendicular to the plane wherein the one or more detection sheets are extending.

The actuator can for example be a piezoceramic actuator, a capacitive actuator, a magnetic actuator, allowing actuation at high frequencies. Such actuators may for example be actuators operating between 1 and 100 kHz, e.g. between 1 and 10 kHz. Examples of such actuators, embodiments of the present invention not being limited thereto, are commercially available and have been described for example in more detail on http://verasonics.com/cmut-hf-transducers/, on https://www.ipms.fraunhofer.de/en/research-development/cmut.html, on https://www.sensorsmag.com/components/sensors-expo-cmuts-enable-next-gen-ultrasound-systems, on http://www.mems.mech.tohoku.ac.jp/Prof.Horsley_seminar_slides170428.pdf, on https://www.invensense.com/news-media/invensense-and-globalfoundries-collaborate-on-industry-leading-ultrasonic-fingerprint-imaging-technology/ and on https://www.nature.com/articles/s41378-018-0022-5.

In one particular example, an actuator with effective frequency of 18 kHz is used, taking into account the weight of the substrate holder that is actuated. The actuator is an electromagnetic exciter operating at a maximum frequency of 18 kHz (frequency between 15 kHz and 18 kHz) and with a maximum displacement of 4 mm. It is for example obtainable from Brüel & Kjaer.

It is further to be noted that due to the optics being fixed and the substrate being actuated, optical errors and disturbances can be reduced or even avoided.

By way of illustration, some more details are given for different embodiments of the present invention, the present invention not being limited thereto.

As indicated above, the system comprises a radiation source In some embodiments, the radiation source may provide continuous or pulsed radiation. The optical system, and e.g. the radiation source, may include lenses, mirrors, birefringent mirrors, fibers and other optical elements. In embodiments of the present invention, more than one radiation source can be provided, either coplanar or not. The radiation source may be any suitable radiation source, such as for example a laser. In one particular example, a 488 nm-wavelength blue laser can be used. In one particular example, the power of the laser is measured as 11 mW directly at the output of the laser. In such example, the power drops to 6-8 mW at the particle. It may be a pulsed laser. For example, a 488 nm with 100mW can be used. Including a high-power radiation source, such as the 100 mW laser, allows reducing the exposure time of the radiation detector (e.g. camera) so as to increase the image quality.

In some embodiments, the irradiation source provides irradiation sheets for irradiating particles in the fluid. Substantially planar irradiation sheets may be provided. Where in embodiments of the present invention reference is made to "substantially planar irradiation sheet", reference is made to a particular radiation beam defined by a width several times larger than its height (for example hundreds or even thousands of times larger). The radiation source may be adapted to provide an irradiation sheet, the sheet being planar. The sheet is defined by an average width, advantageously a substantially homogeneous width, being for example smaller than 100 µm, e.g. smaller than 50 µm, e.g. smaller than 25 µm, such as for example between 5 µm and 0.5 µm. Over at least a portion of its surface (length and width), e.g. several millimeters, the irradiation sheet has advantageously virtually homogeneous intensity (e.g. illumination) in a small thickness of the sheet. This small thickness may thus be within the range of for example smaller than 100 µm, e.g. smaller than 50 µm, e.g. smaller than 25 µm, such as for example between 5 µm and 0.5 µm. The irradiation sheet may be induced by any suitable type of radiation source, such as for example but not limited to a laser source. Optical systems for generating an irradiation sheet are known by the persons skilled in the art and are therefore not discussed in more detail here.

In some embodiments of the present invention scanning the fluid with the irradiation sheet is used, instead of irradiating the whole fluid using a single flooding beam, or selecting specific places (such as planes) in the fluid for performing the irradiation and detecting particles crossing said places. The scanning of the fluid is done by providing an oscillating movement between the irradiation sheet and the substrate which contains the fluid in a channel or reservoir. The movement advantageously may have a vector component which is perpendicular to the plane wherein the irradiation sheet extends. For example, the oscillating movement may be purely perpendicular to the irradiation sheet. An advantage of this is an improvement of signal detection because the irradiation sheet does not move, the focus of the radiation detection unit can be fixed to the irradiation sheet, with a limited focal distance. Using small depth of focus improves the signal-to-noise ratio, and the radiation unit is less affected by noise. As indicated above, when systems with a limited depth of focus detection units are used, the radiation system also may be a flood irradiation system. Nevertheless, even with limited depth of focus detection units, using matched irradiation sheets may be advantageous in order to avoid photobleaching of the sample.

In some embodiments, the precise position of the substrate can be detected, so information regarding the position of the irradiation sheet with respect to the substrate containing the fluid can be used to extract information regarding the position and velocity of particles in the fluid. The information can be 3D information, even if using a single detector.

As indicated above, the system comprises a radiation detection unit. This may for example be a radiation sensor, fluorescence sensor, etc. The detection unit may comprise elements for detecting and measuring not only intensity of impinging radiation, but also its wavelength, for example by including filters (e.g. color filters). Also, the unit may include elements for extracting information of the position in 2D where an emission, scattering, transmission, . . . event occurred. In one particular example, an array of sensing pixels may be included in a sensor, for example an array of at least 320×200 pixels, although it will be clear that the number of pixels used is not limited thereto.

In some embodiments of the present invention, the radiation detection unit may include optical elements, such as apertures, lenses, mirrors, birefringent mirrors, a dichromic filter cube, an objective, etc. Specifically, in one particular example, the optics may include a lens (100 mm f/2.8 ED UMC macro lens), and a high working distance objective (small depth of focus 20× & 50×). Some of the optical elements may be shared by the radiation source, for example some of the apertures, lenses and birefringent mirrors. The unit may also include electronic elements for obtaining a data signal based on the detected radiation. More than one detector may be included in the detection unit, for example for detecting different wavelengths. One can for example use two detectors for detecting two different particle types (or sizes) having different fluorescence emission spectra. Using an additional aperture may allow for scanning the same sheet again after a short time (before one vibration cycle is completed), calculate its velocity and improve tracking by adding velocity information in the algorithm. However, a single radiation detector (e.g. a single camera) may be advantageously used as radiation detection unit, obtaining a compact setup.

In some embodiments, the radiation detection unit includes a high-speed camera, e.g. a CCD camera with at least few thousands of frames per second. However, other cameras can be used as long as their frame rate is high enough to detect emission events from the particles in the fluid included in the oscillating substrate. It is noted that the only limit to temporal resolution is set by the camera, the type of radiation source (continuous, pulsed) and speed of oscillation used.

As indicated above, the system further comprises a substrate holder. On the substrate holder, the substrate can be glued, attached or otherwise fixed. In some embodiments, the substrate holder can hold interchangeable substrates, so the system can be used repeatedly with disposable substrates. In other embodiments, the system includes such substrate. In particular embodiments of the present invention, the system may also include the substrate including a channel allowing the flow of fluid. It is noted that a channel defines a particular direction of flow. In these embodiments, it is preferred that the channel is oriented (or orientable) with respect to the radiation source so that the direction of flow is both perpendicular to the oscillation movement, and parallel to the larger dimension of the irradiation sheet (either the width or the length of the portion with homogeneous intensity, whichever is larger). In this way, the volume of fluid available for scanning by the system may be large along the channel.

Suitable substrates include a space where fluid may be contained. For example, a channel for allowing a flow of fluid, or a reservoir for holding fluid, may be included in the substrate, or more than one reservoir or channel. The radiation source can be arranged so an irradiation sheet provided by the source covers at least part of a plane intersecting the reservoir or channel. For example, it can partially or completely intersect the channel or reservoir in a longitudinal direction. For example, the irradiation sheet may extend longitudinally through a reservoir or channel, and the width of the irradiation sheet may be comparable or at least as large as the width of the reservoir or channel, so a complete intersection can be provided.

As indicated above, the system further comprises an actuator which is configured to provide mechanical oscillating movement (e.g. vibration) to the substrate. For example, the actuator can provide oscillating movement to the substrate holder. For example, the substrate can be placed on an actuator including a substrate holder (for example a simple surface of the actuator), where the substrate is fixed.

The actuator and the radiation source may be configured so that the direction of the movement provided by the actuator is perpendicular to the plane defined by the irradiation sheet provided by the radiation source. For example, the movement may be an oscillation in the vertical direction, while the irradiation sheet may be defined in a horizontal plane and may partially or completely intersect the channel in a longitudinal direction. In that way, the irradiation sheet can scan across the whole volume of the reservoir or channel, although the sheet is much thinner than the channel or reservoir.

In other embodiments, the oscillation movement may be lateral while the irradiation sheet is defined in a vertical plane partially or completely intersecting the channel in a longitudinal direction. Other geometrical variations can be provided by the skilled person.

The actuator may be an electrodynamic vibration exciter or shaker, such as a piezoelectric actuator. The vibration frequency may be frequency in a range of tens of Hz to 100 kHz. The frequency of the vibration provided by the actuator may be tuned in accordance with the frame rate of the radiation detection unit, which typically should be higher than the vibration frequency, in order to obtain a good temporal resolution and not to miss any detection event. The amplitude of the oscillating movement may be chosen so it is sufficient to scan the reservoir or channel in the direction of the movement. For example, the maximum amplitude, i.e. the distance over which a movement is induced in a direction perpendicular to the irradiation sheet over a distance may be at least 1 mm, e.g. at least 2 mm, e.g. at least 5 mm, e.g. at least 10 mm.

In one particular example, the actuator is a piezoceramic actuator comprising lead zirconate titanate (PZT). For example, the actuator may be a mini-shaker with a force rating of 10 N sine peak, a frequency range from DC to 18 kHz and a maximum displacement of 4 mm peak-to-peak. The speed of the shaker is sufficient considering the speed of the camera. Maximum input current that can be inputted to the device is 1.8 $A_{rms}$. For example, a shaker can be used which can reach a vibration frequency of 50 Hz, with a force rating of up to 100 N sine peak and up to 8 mm of displacement range. Such shakers are commercially available.

The system may include accurate control of the oscillating movement, so that the relative position of the irradiation sheet with respect to the substrate (or substrate holder) are unambiguously determined at each instant of time. In some embodiments, sensors may acquire this information, for example electronic sensors. In some embodiments of the present invention, the relative position of the irradiation sheet with respect to the substrate is obtained from the measurement of the displacement of the substrate (or substrate holder) by means of a displacement sensor. Any sensor with suitable resolution at the actuator frequencies may be used to measure the position of the substrate or holder thereof. For example, a capacitive displacement sensor can be used. Commercial capacitive displacement sensors may reach a resolution of 0.0007% at 100 Hz frequencies, which provides a position accuracy of 0.08 nanometers. These sensors may provide ±10 V differential output, for highest precision and noise immunity.

Further components may be included. For example, a driver for the actuator may be included, such as a power amplifier with a maximum voltage gain of 40 dB (10-20-30-40 dB) and flat frequency response from 10 Hz to 20 kHz (±0.5 dB), with low distortion enabling operation in acoustical measurement setups. For example, a controller can be used for driving the actuator and controlling its power amplifier. For example, a data reader can be included for extracting the measurements of the displacement sensor. In some embodiments, a multi-function data acquisition device is used for driving the actuator through the power amplifier, and for reading the data from the capacitive displacement sensor. Commercial devices, including USB interfaces, have enough analog and digital inputs and a speed to satisfy the data acquisition requirements of systems of the present invention.

Multiple planar irradiation beams may be provided, for example with different wavelengths. They may be coplanar, for increasing the detection area in a plane of the channel or reservoir of the substrate allowing simultaneous detection at different regions of the reservoir or channel of the substrate. If there is a rather deep channel and scanning takes a long time, too much information may be lost. Then the coplanar approach may provide a solution to this. For example, if we have 3 sheets, the scanning time can be reduced by three in principle.

Some embodiments of the present invention can be used with interchangeable substrates, as already mentioned. In some embodiments, the differences between different substrates can be compensated by adjusting the offset of the substrate holder and of the radiation detector. For example lateral offset (e.g. in the plane of the radiation sheet) can be compensated by including a lateral translational stage, and vertical offset (e.g. the position of the plane with respect to the channel or reservoir) with a vertical stage. These can be in any of the substrate holder, and/or the actuator attached to the substrate holder, and/or the radiation source, and/or the radiation detection unit. For example, two manual translation stages with 25 mm travel range can be used in the system for adjusting the position of the substrate holder in X and Y directions, and a large area translation stage with 60 mm travel range can be used for adjusting the focus of the camera. All components may be mounted on an optical breadboard with passive vibration isolation supports, or on an optical table with active vibration isolation feet.

In embodiments of the present invention, the radiation source and radiation detection unit are fixed, while the substrate holder is movable, thus allowing scanning in the volume.

The system can be used for PIV, or for particle imaging. The vibration can be used for scanning and optically slicing a particle, for example a cell. The width of the one or more detection sheets in these cases would be much smaller than the overall size (e.g. diametral size) of the particle, which may be for example 10 μm. The system in this second case is operated in a similar way as in the case of PIV, except that the data acquisition and interpretation is different. While in the PIV case, the position and time of detection events are used to reconstruct the trajectory of a particle, in this second case the images obtained by the radiation detection unit of the particle are projected on top of each other, and the stacked projections provide a reconstruction of the particle.

In a second aspect, the present invention provides a method of analyzing particles in a fluid, such as for example to perform particle image velocimetry or imaging of a particle. The method comprises providing a fluid inside a substrate comprising a channel or reservoir, the fluid comprising particles, providing irradiation to the fluid in the substrate and detecting radiation from particles in the fluid in the substrate. At least one of said providing irradiation and said detecting radiation is adapted so as to detect radiation in one or more detection sheets in the substrate. The method further comprises providing an oscillating mechanical movement of the substrate with respect to the irradiation sheet, the oscillating mechanical movement being a movement in a direction perpendicular to the plane wherein the irradiation sheet extends. By detecting at different relative position of the irradiation sheet with respect to the substrate, e.g. a 3D image can be established. By detecting over a longer period of time, e.g. a track of the particle in the fluid could be determined. Further features and advantages of methods according to embodiments of the present invention may correspond with features and advantages as described for the first aspect.

The following example describes the PIV of a single particle, for simplification of the discussion. During an oscillation, a particle in a fluid may traverse the detection sheet. This causes a radiation event, in which the particle emits radiation, which can be detected. The precise position in the plane of the detection sheet can be detected and recorded. For example, the components X1 and Y1 of the traversing point in the irradiation sheet can be recorded (X and Y being orthogonal directions defining that plane). This allows detection and recording to 2 components of the position of the particle at that precise time. Because the oscillation parameters are known or are measurable, the position of said plane with respect to the channel or reservoir in the substrate can be known. For example, the component Z1 of the position, e.g. the distance between the bottom of the channel or reservoir and the detection sheet, in the moment at which the particle radiates, can be known. This allows recording the three components of the position of the particle in the volume of the fluid.

As the oscillation progresses, the particle may traverse again the detection sheet, the radiation from the particle is detected a second time, and the two or even three components (X2, Y2, Z2) of the position can be recorded again as before. If, during the time between the two detection events, the particle moves, e.g. due to flow, the recorded positions of the two detection events will be different. The time and distance between the two recorded positions (X1, Y1, Z1) and (X2, Y2, Z2) can give the 3 components of the velocity of the particle.

By way of illustration, embodiments of the present invention not being limited thereto, some experimental results are described obtained using an exemplary system, illustrating features and advantages of such a particular example of a system according to an embodiment of the present invention.

Figure 1B:
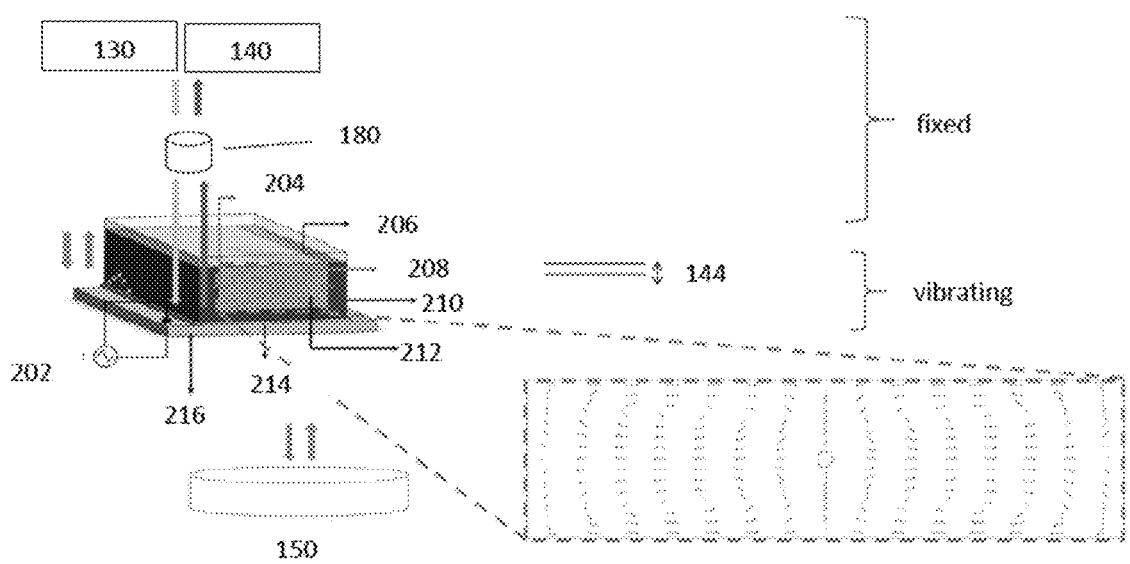

The exemplary setup used is show in FIG. 1 in two schematic representations. The 3D PIV setup of the present example is composed of a high-speed CCD camera, a ... laser, optics (lens, objective, dichromic filter cube), an electrodynamic vibration exciter (shaker, also referred to as actuator), a power amplifier, a USB data acquisition device, manual YZ- and X-stages and a computer interface. The actuator in the present example is a piezoceramic actuator. The actuator directly functions as the substrate holder, for holding the substrate with the microfluidic channel. In the present example, the channel width is matched with the speed of sound in the liquid medium and the frequency of the PZT actuator, which give rise to vortices. The substrate is then placed on the vertically moving actuator, which makes that a thin detection plane scans across the channel volume. A detected fluorescent bead at a given moment and at a given position is identified as the same bead in another detection plane some time later, allowing to reconstruct the velocity field. FIG. 1 shows two schematic examples of the 3D PIV setup as used. The different components of the exemplary system are described below.

The radiation detection unit in the present example is a high-speed camera. The model of the high-speed camera used in the setup is PCO.dimax HS4. The frame rate of the camera as a function of sensor size for a set of particular examples used is given in Table 1, which shows a maximum of 4-megapixel sensor (highest resolution) for the given examples.

TABLE 1

Frame rate of the high-speed camera suitable for a 3D PIV setup.

| Sensor Size [pixel] | Frame Rate [fps] |
|---|---|
| 2000 × 2000 | 2277 |
| 1400 × 1050 | 5469 |
| 1280 × 720 | 8226 |
| 1000 × 1000 | 7039 |
| 800 × 600 | 12841 |
| 640 × 480 | 17985 |
| 320 × 200 | 46746 |

The camera has a frame rate of 2277 fps with the maximum sensor size, and it can reach a maximum frame rate of 46746 fps at a 320×200 pixels resolution. For a typical microfluidics application, where 1000×1000 pixels images are usually analyzed, a frame rate of 7039 fps can be achieved. Other cameras can be used, for example cameras with a frame rate of 2000 fps at a resolution of 1024×1024 pixels. A balance can be obtained between sensor size and speed. An exemplary alternative for the current camera would be for example a Photron Fastcam SA-Z, which has a frame rate of 2000 fps at a resolution of 1024×1024 pixels. Compared to the existing device the speed can be increased 3 times. However, the sensor is smaller than the sensor of the existing device (1 MPix).

An actuator for inducing movement of particles in the sample also is present in the exemplary setup (not to be confused with the actuator inducing the oscillating movement of the sample holder). The actuator is a piezoceramic actuator. In the present example, the channel width is matched with the speed of sound in the liquid medium and the frequency of the PZT actuator, which give rise to vortices.

In the current setup, a mini-shaker Type 4810 from Brüel-Kjaer is used in the system for moving the scan through the depth of the sample. The device has a force rating 10 N sine peak, a frequency range from DC to 18 kHz and a maximum displacement of 4 mm peak-to-peak. The speed of the shaker is sufficient considering the speed of the camera. Maximum input current that can be inputted to the device is 1.8 $A_{rms}$. An exemplary alternative is a Spektra SE-09 shaker can reach up to 50 Hz speed, which also has ten times the force rating and twice displacement range.

The shaker, also referred to as vibrator, is driven by a power amplifier Type 2718 from Brüel-Kjaer. The device has a maximum voltage gain of 40 dB (10-20-30-40 dB) and flat frequency response from 10 Hz to 20 kHz (±0.5 dB). It provides low distortion and enables operation in acoustical measurement setups.

The substrate is then placed on the vertically moving actuator, which makes that a thin detection plane scans across the channel volume. A detected fluorescent bead at a given moment and at a given position is identified as the same bead in another detection plane some time later, allowing to reconstruct the velocity field.

A multi-function data acquisition device with USB interface from National Instruments (USB-6211) is used for driving the mini-shaker through the power amplifier and for reading the data from the capacitive displacement sensor (see below for the details). The device has 16 AI (16-Bit, 250 kS/s), 2 AO (250 kS/s), 4 DI and 4 DO. The speed and the number of the input/output ports of the data acquisition device is more than sufficient for the 3D PIV setup.

A CPL350 capacitive displacement sensor from Lion Precision is also used. The device has a high resolution (0.0007% @ 100 Hz typical -as low as 0.08 nanometers). It gives a ±10 V differential output for highest precision and noise immunity. The specifications of the sensor are sufficient for the 3D PIV setup. This device is controlled by the data acquisition device as mentioned above.

A 488 nm-wavelength blue laser from Pavillion Integration Corporation (WSR488-08FS). The power of the laser is measured as 11 mW directly at the output of the laser. However, the power drops to 6-8 mW at the objective. The pulse rate of the laser is unknown since the user manual of the device is not available. Alternatively, an OBIS 488 nm LS 100 mW Laser System from Coherent can be used in the 3D PIV system for reducing the exposure time of the camera and increasing the image quality.

The optics is composed of a Samyang 100 mm f/2.8 ED UMC macro lens, a dichromatic filter cube and a high working distance (small depth of focus 20× & 50×) objective.

Two manual translation stages with 25 mm travel range from Thorlabs (XR25P/M) are used in the system for adjusting the position of the sample in X and Y directions. A large area translation stage with 60 mm travel range from Thorlabs (TB3030/M) is used for adjusting the focus of the camera. All components are mounted on an optical breadboard with passive vibration isolation supports (PWA075). Better vibration isolation can be achieved by replacing the breadboard arrangement and passive isolation supports with an optical table with active vibration isolation feet.

Figure 2:
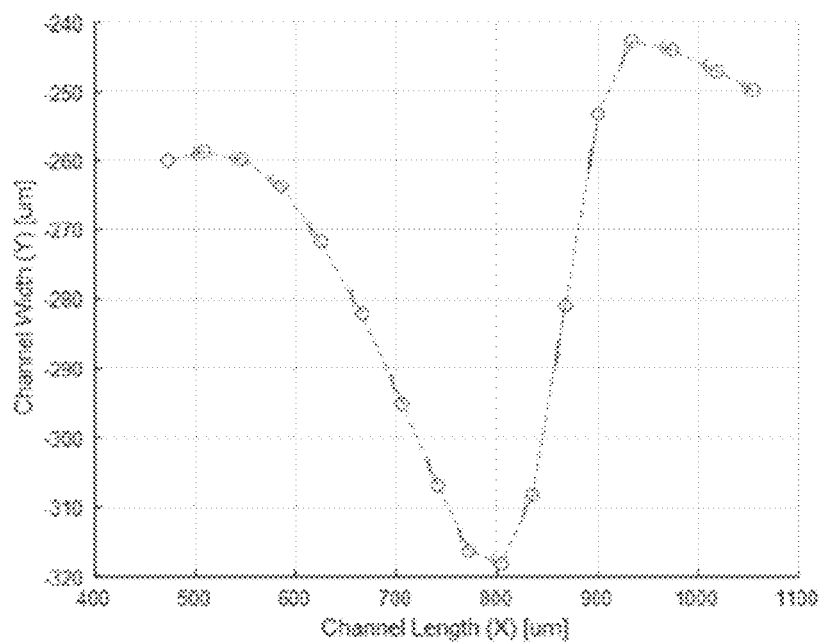
FIG. 2, including
Figure 2B:
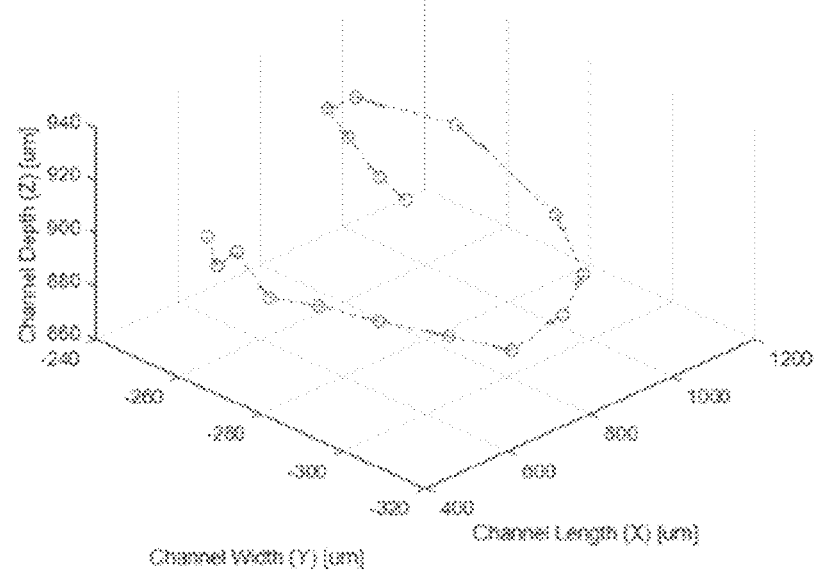

FIG. 2 illustrates how a velocity of a particle moving in three dimensions typically is detected in a two-dimensional setup. FIG. 2a shows the track of a particle as it would be detected in a 2D setup and FIG. 2b shows how it is detected in a 3D setup.

In the present example, the 3D PIV experiments were carried out using a silicon-glass microfluidic chip designed for acoustic streaming. The channel width and height are 375 um and 70 um, respectively. An alternating potential of 7.5 Vpp is applied to the bulk PZT actuator, which is located underneath the microfluidic chip, in order to generate acoustic waves for streaming the fluorescent polystyrene (PS) particles. Having a diameter of 0.5 μm (larger than the critical diameter for acoustic streaming), the particles move along the channel following a helical path (no flow applied). It is to be noted that depending on the channel dimensions and the applied frequency, there will be a critical diameter above which the particles are focused and below which the particles will move in vortices. The path followed by two particles passing through the same section of the microchannel at different times was tracked by the 3D PIV setup and shown in FIG. 3.

Figure 3A:
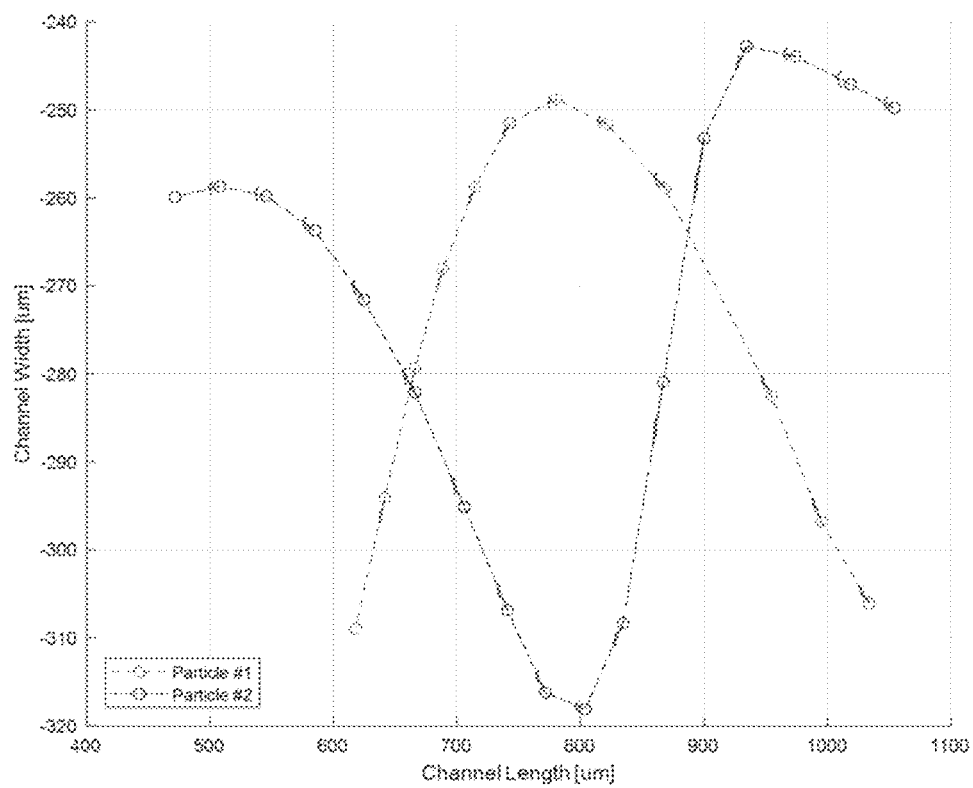
FIG. 3(a) to FIG. 3(c) illustrates examples of trajectories of particles, as obtained using a system according to the present invention.
Figure 3B:
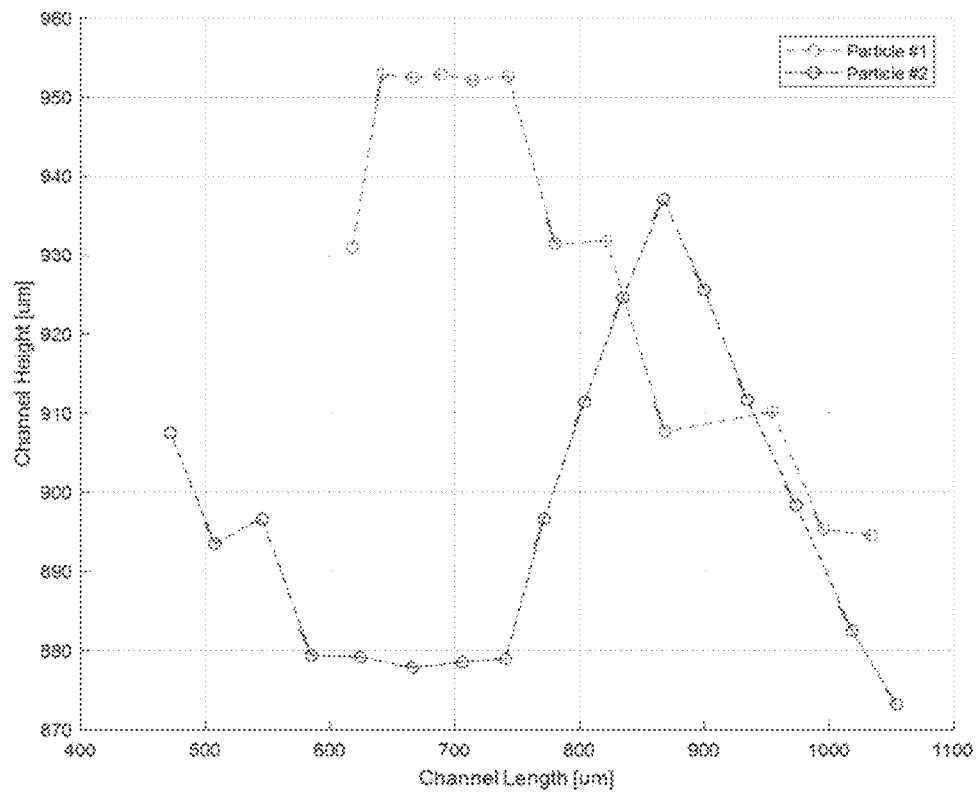
Figure 3C:
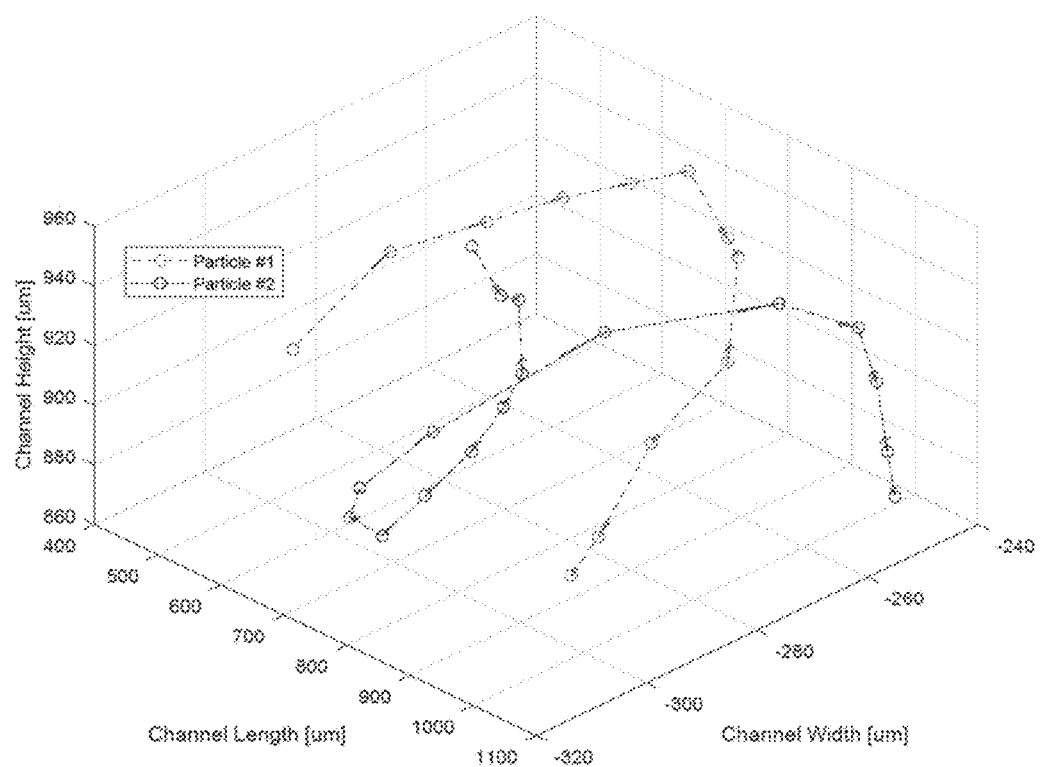

FIG. 3 thus shows the 3D path followed by the two 5 μm-diameter particles tracked by the system: (a) shows a top view (XY), (b) shows a side view (XZ) and (c) shows an isometric view. The tracks are obtained at the same location within the microchannel, however at different times. The X- and Y-axis values are represented as the distance from the upper left corner of the field of interest (image) and Z-axis value represent the distance from the reference position of the capacitive displacement sensor.

Figure 4A:
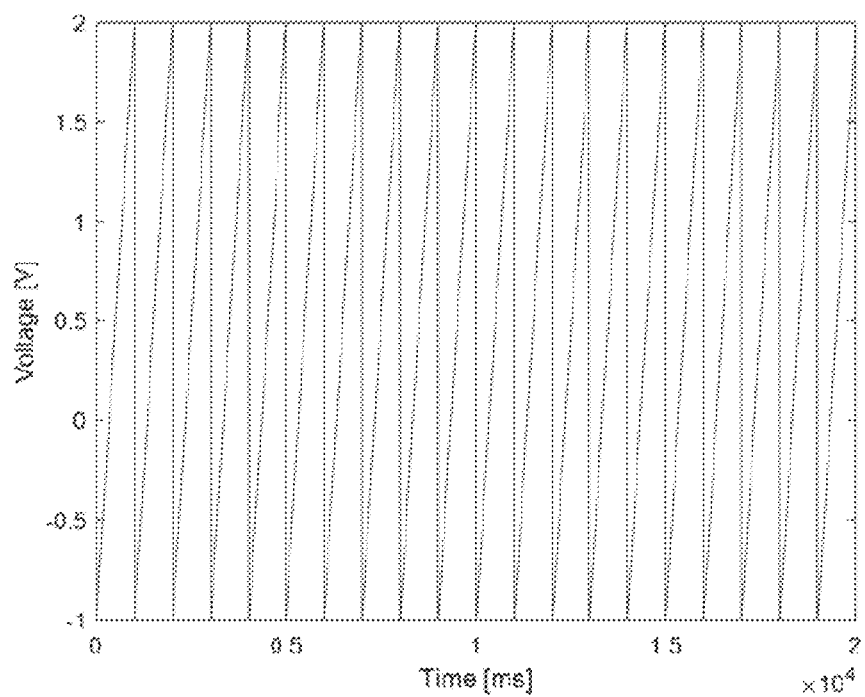
FIGS. 4(a) and 4(b), illustrates FIG. 4(a) the ideal ramp signal applied to the electrodynamic shaker and FIG. 4(b) the actual response of the device.
Figure 4B:
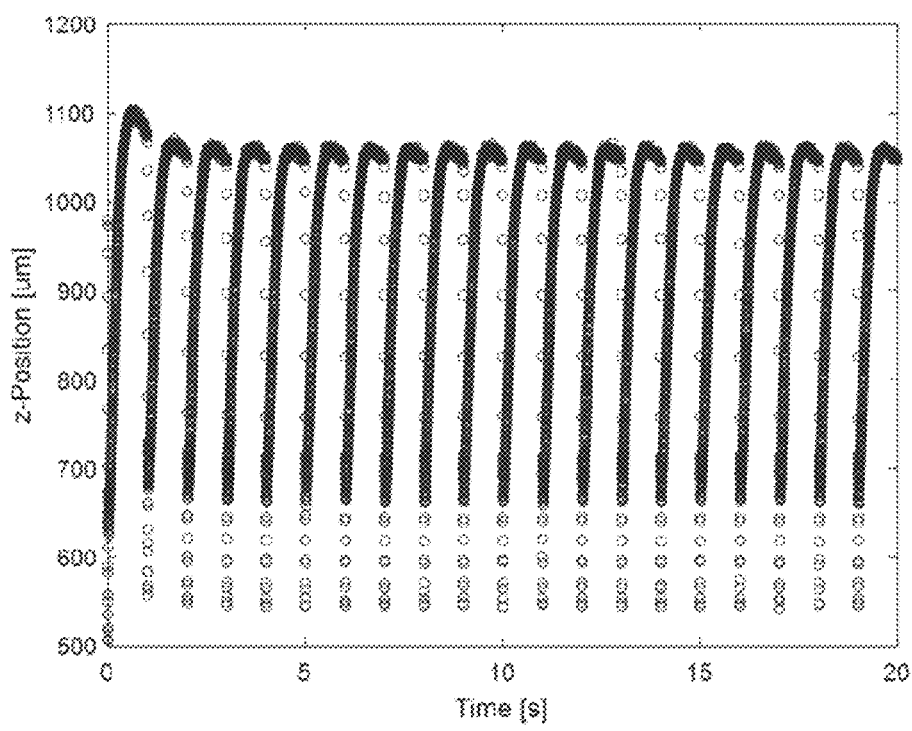
Figure 5:
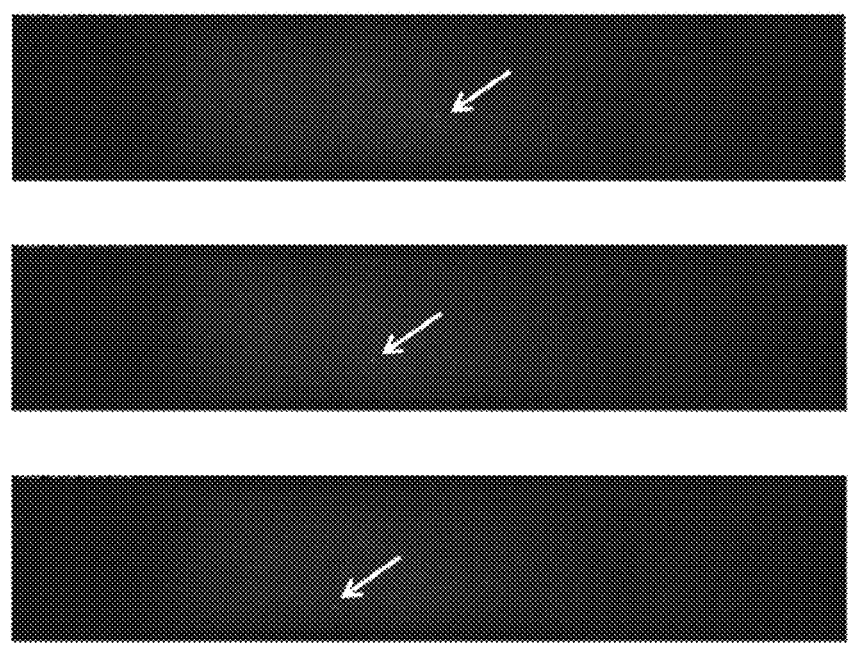
FIG. 5 illustrates some of the frames Particle #2 appears to be in focus: (a) near the bottom (t=2.25 s, z=882.5 um), (b) the middle (t=6.35 s, z=937.1 um) and (c) the top (t=9.275 s, z=896.7 um) of the microchannel. Here z value represents the distance from the reference plane of the capacitive displacement sensor.

The exposure time of the camera was set to 5 ms, where the z-position was collected by a capacitive displacement sensor at a rate of 1000 scans/second. The electrodynamic mini-shaker moves back and forth, scanning 500 um (to ensure the entire channel height is covered) along the z-axis every second following a ramp signal (FIG. Y)., as shown in FIG. 4. Some example frames, where Particle #2 appears to be in focus during the experiment along with the corresponding z-position can be seen in FIG. Z5. The mean velocity of the particles along their path are found as 41.4 um/s and 45.5 um/s, respectively. These experimental results illustrate features and advantages of an embodiment according to the present invention.

The invention claimed is:

1. A system for imaging particles in a fluid, the system comprising:
a substrate holder for holding a substrate comprising a channel or reservoir for containing the fluid in the substrate,
a radiation source for providing irradiation in the substrate,
a radiation detection unit for detecting particles in the fluid in the substrate,
at least one of the radiation source and the radiation detection unit being configured so as to obtain detection in one or more distinct detection sheets in the substrate,
wherein the system further comprises an actuator configured for imparting an oscillating mechanical movement of the substrate holder with respect to the radiation detection unit and the radiation source, the oscillating mechanical movement comprising a movement component in a direction perpendicular to a plane wherein the one or more detection sheets are extending,
wherein the actuator is configured for imparting an oscillation of the substrate holder at a frequency in a range of tens of Hz to 100kHz.

2. The system according to claim 1, wherein the radiation detection unit has a depth of focus smaller than 100 μm.

3. The system according to claim 1, wherein the radiation source is adapted for providing an irradiation sheet having a thickness smaller than 100 μm.

4. The system according to claim 1, wherein the substrate holder comprises a substrate having a channel for defining a directional flow of fluid in a direction perpendicular to the oscillating mechanical movement provided by the actuator.

5. The system according to claim 1, the system further including a position sensor for measuring a relative position of the substrate holder with respect to the one or more detection sheets allowing obtaining three-dimensional positional information of the detected particles.

6. The system of claim 1 wherein the actuator is configured for imparting a movement in a direction perpendicular to the one or more detection sheets over a distance in this direction being at least 1 mm.

7. Use of a system of claim 1 for detecting three-dimensional components of velocity of particles in a fluid.

8. A method of analyzing particles in a fluid, the method comprising:
    providing a fluid inside a substrate comprising a channel or reservoir, the fluid comprising particles,
    providing a irradiation to the substrate,
    detecting radiation from particles in the fluid,
    wherein at least one of said providing irradiation and detecting radiation is adapted so as to detect radiation in one or more detection sheets in the substrate,
    the method further comprising providing an oscillating mechanical movement of the substrate with respect to the one or more detection sheets, the oscillating mechanical movement comprising a movement component in a direction perpendicular to a plane wherein the one or more detection sheets extends,
    wherein providing an oscillating mechanical movement comprises providing an oscillating mechanical movement at a frequency in a range of tens of Hz to 100 kHz.

9. The method of claim 8, wherein detecting radiation comprises detecting with a depth of focus smaller than 100 µm.

10. The method of claim 8, wherein providing irradiation comprises a stimulating radiation comprises providing an irradiation sheet having a thickness smaller than 100 µm.

11. The method of claim 8, wherein providing a fluid inside a substrate providing a directional flow of fluid inside the substrate in a direction perpendicular to the oscillating mechanical movement.

12. The method of claim 8 wherein providing a relative oscillating movement in a direction perpendicular to the plane wherein the one or more detection sheets extends comprises providing an oscillating movement over a distance in this direction being at least being at least 1 mm.

13. The method of claim 8 further comprising obtaining three-dimensional positional information of the detected particles by detecting a relative position of the substrate with respect to the one or more detection sheets.

14. The method of claim 8 further comprising identifying a same particle at different moments and positions during the oscillating movement, and reconstructing a velocity field of that particle and/or
    wherein the method further comprises optically slicing a particle during the oscillating movement, projecting the slices on top of another, and reconstructing the particle.

15. A system for imaging particles in a fluid, the system comprising:
    a substrate holder for holding a substrate comprising a channel or reservoir for containing the fluid in the substrate,
    a radiation source for providing irradiation in the substrate,
    a radiation detection unit for detecting particles in the fluid in the substrate, at least one of the radiation source and the radiation detection unit being configured so as to obtain detection in one or more distinct detection sheets in the substrate, and
    an actuator configured for imparting an oscillating mechanical movement of the substrate holder with respect to the radiation detection unit and the radiation source, the oscillating mechanical movement comprising a movement component in a direction perpendicular to a plane wherein the one or more detection sheets are extending;
    wherein the actuator is configured for imparting a movement in a direction perpendicular to the one or more detection sheets over a distance in this direction being at least 1mm.

* * * * *